(12) United States Patent
Keh

(10) Patent No.: US 8,382,287 B2
(45) Date of Patent: Feb. 26, 2013

(54) METHOD AND APPARATUS FOR CALIBRATING A COLOR TEMPERATURE OF A PROJECTOR

(75) Inventor: Yong-Chan Keh, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 668 days.

(21) Appl. No.: 12/557,079

(22) Filed: Sep. 10, 2009

(65) Prior Publication Data
US 2010/0128052 A1 May 27, 2010

(30) Foreign Application Priority Data
Nov. 25, 2008 (KR) .................. 10-2008-0117402

(51) Int. Cl.
G03B 21/00 (2006.01)

(52) U.S. Cl. .............. 353/31; 353/30; 353/69; 353/70; 353/94; 353/98; 353/99; 353/122; 348/590

(58) Field of Classification Search ........... 353/30, 353/31, 48, 49, 69, 70, 85, 94, 98, 99, 122; 348/656, 657, 658, 189, 191, 590, E17.004, 348/E9.051; 345/1.2, 589, 591, 600, 619, 345/690
See application file for complete search history.

(56) References Cited

U.S. PATENT DOCUMENTS

| | | | | |
|---|---|---|---|---|
| 4,127,322 A | * | 11/1978 | Jacobson et al. | 353/31 |
| 6,078,732 A | * | 6/2000 | Beretta | 358/1.9 |
| 6,163,377 A | * | 12/2000 | Boles et al. | 356/402 |
| 6,320,668 B1 | * | 11/2001 | Kim | 358/1.1 |
| 6,560,410 B2 | * | 5/2003 | Ichikawa et al. | 396/2 |
| 6,953,251 B2 | * | 10/2005 | Seki et al. | 353/85 |
| 7,170,535 B2 | * | 1/2007 | Matsuda | 345/690 |
| 7,728,846 B2 | * | 6/2010 | Higgins et al. | 345/600 |
| 7,808,526 B2 | * | 10/2010 | Xu et al. | 348/189 |
| 7,948,499 B2 | * | 5/2011 | Ramanath et al. | 345/581 |
| 2002/0024640 A1 | * | 2/2002 | Ioka | 353/94 |
| 2003/0132905 A1 | * | 7/2003 | Lee et al. | 345/89 |
| 2004/0140982 A1 | * | 7/2004 | Pate | 345/600 |
| 2005/0275912 A1 | * | 12/2005 | Chen et al. | 358/523 |
| 2006/0274286 A1 | * | 12/2006 | Morejon et al. | 353/85 |
| 2007/0046826 A1 | | 3/2007 | Bellis, II et al. | |
| 2007/0058088 A1 | * | 3/2007 | Schubert et al. | 348/743 |
| 2007/0103646 A1 | | 5/2007 | Young | |
| 2008/0239248 A1 | * | 10/2008 | Mihara et al. | 353/85 |

FOREIGN PATENT DOCUMENTS

JP 2005-121688 5/2005

* cited by examiner

*Primary Examiner* — Georgia Y Epps
*Assistant Examiner* — Sultan Chowdhury
(74) *Attorney, Agent, or Firm* — The Farrell Law Firm, P.C.

(57) ABSTRACT

A method and apparatus for calibrating a color temperature of a projector that creates a light of a desired color by mixing primary lights. The method includes setting target values for the mixed light, measuring color coordinate values for the primary lights, calculating the target brightness values for the primary lights using the target values and the measured color coordinate values, and calibrating the output of the primary lights output from the projector based on the calculated target brightness values.

10 Claims, 4 Drawing Sheets

METHOD AND APPARATUS FOR CALIBRATING A COLOR TEMPERATURE OF A PROJECTOR

PRIORITY

This application claims priority under 35 U.S.C. §119(a) to an application filed in the Korean Industrial Property Office on Nov. 25, 2008 and assigned Serial No. 10-2008-0117402, the content of which is incorporated herein by reference.

BACKGROUND OF THE INVENTION

1. Field of the Invention

The present invention relates generally to a projector including primary color light sources such as Light Emitting Diodes (LEDs), and more particularly to a method and apparatus for calibrating a color temperature of a projector.

2. Description of the Related Art

In general, RGB light emitting diodes create a red light, a green light, and a blue light, respectively, i.e., primary colors, and a projector including RGB light emitting diodes creates a light of the desired color by mixing the primary color lights. The color temperature of the projector is measured for a light (generally, a white light) of a reference color output from the projector. The color temperature variation based on a target color temperature is generated for the white light output from the projector according to the brightness value and wavelength of the primary color light sources. The color temperature variation is influenced by a coupling error or a loss generated in the process of installing primary color light sources, lenses, and beam splitters in the projector.

FIGS. 1 and 2 are graphs illustrating a distribution of color temperatures. The distribution in FIG. 1 is caused by brightness and wavelength variations of primary color light sources. The distribution in FIG. 2 is caused by a coupling error or loss generated during the installation of the primary color light sources, lenses, and beam splitters in a projector.

A red color light emitting diode has a brightness value ranging from 19.0 to 24.5 lm and a wavelength ranging from 615 to 620 nm, a green color light emitting diode has a brightness value ranging from 54.0 to 70.0 lm and a wavelength ranging from 525 to 535 nm, and a blue color light emitting diode has a brightness value ranging from 11.0 to 14.5 lm and a wavelength ranging from 455 to 465 nm.

FIGS. 1 and 2 illustrate a part of CIE 1931 color space and the Planckian locus. In the graphs of FIGS. 1 and 2, the x-axis represents an x chromaticity value and the y-axis represents a y chromaticity value. As shown in Equation (1) below, x and y are expressed by the functions of tristimulus values, X, Y, and Z wherein Y corresponds to the brightness value of a light.

$$x = \frac{X}{X+Y+Z} \quad (1)$$
$$y = \frac{Y}{X+Y+Z}$$

FIGS. 1 and 2 plot a Correlated Color Temperature (CCT), $CCT_{MIX}$, which is a target CCT, D65, 6,500 K, and D93, 9,300K. In FIG. 1, the CCTs are distributed within the range from 6,457 to 18,682 K. In FIG. 2, the CCTs are distributed within the range from 6,669 to 9,504 K.

If an observer can visually recognize the distribution of color temperatures, due to 1) brightness and wavelength variations of primary color light sources or 2) a coupling error or a loss generated in the process of installing primary color light sources, lenses, and beam splitters in the projector, then the color temperatures of the projectors need to be calibrated. However, currently, the color temperatures are not easily calibrated.

SUMMARY OF THE INVENTION

The present invention has been made to solve the above-mentioned problems occurring in the prior art, and the present invention provides a method for easily and automatically calibrating the color temperature of a projector.

In accordance with an aspect of the present invention, there is provided a method for calibrating the color temperature of a projector that creates a light of a desired color by mixing primary lights. The method includes: setting target values for the mixed light; measuring color coordinate values for the primary lights; calculating target brightness values for the primary lights using the target values and the measured color coordinate values; and calibrating the output of the primary lights output from the projector based on the calculated target brightness values.

BRIEF DESCRIPTION OF THE DRAWINGS

The above and other aspects, features, and advantages of the present invention will be more apparent from taking the following detailed description taken in conjunction with the accompanying drawings, in which.

DETAILED DESCRIPTION OF THE EMBODIMENTS OF THE INVENTION

Hereinafter, embodiments of the present invention will be described with reference to the accompanying drawings. In the following description of the present invention, a detailed description of known functions and configurations incorporated herein will be omitted when it may obscure the subject matter of the present invention.

Figure 1:
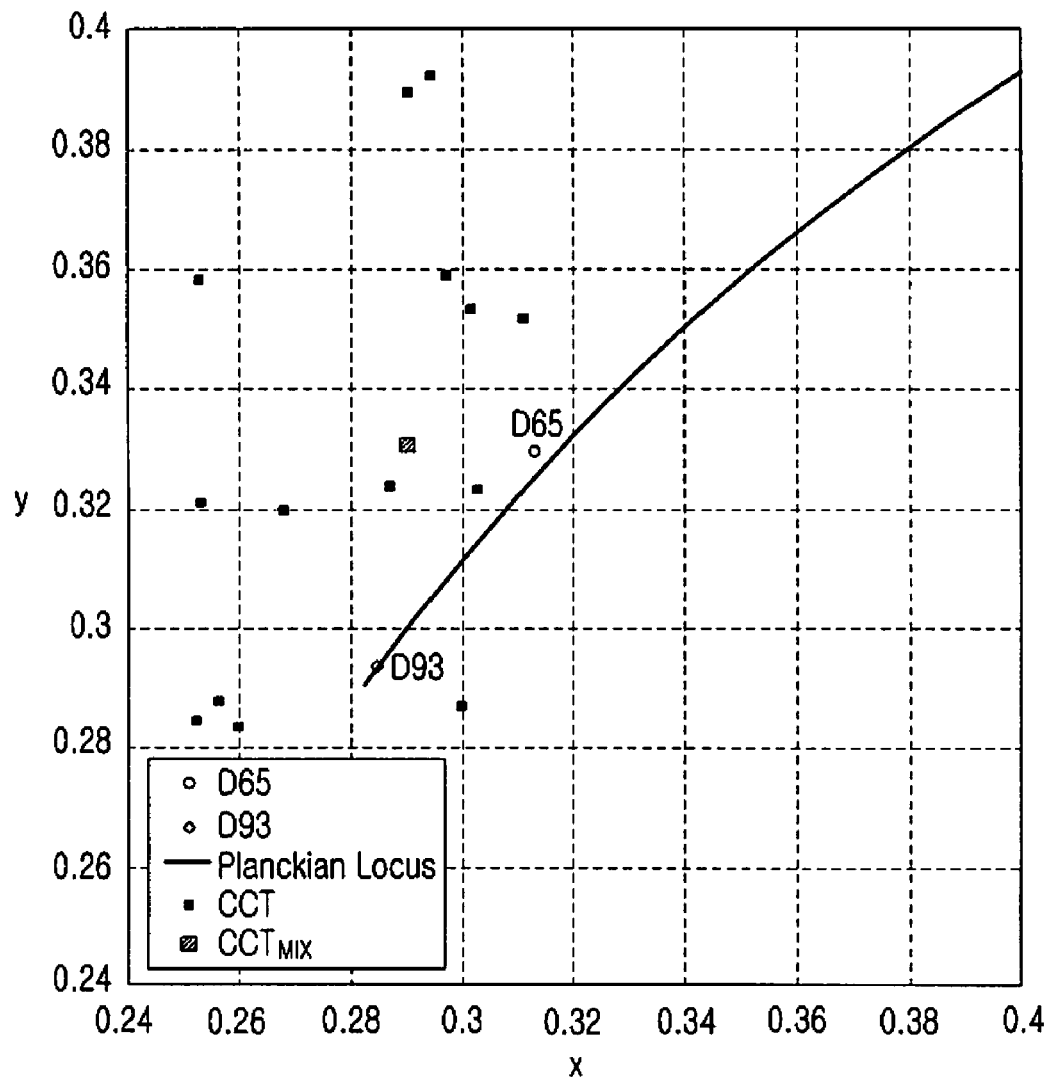
FIG. 1 is a graph illustrating a distribution of color temperatures caused by brightness and wavelength variations of primary color light sources.
Figure 2:
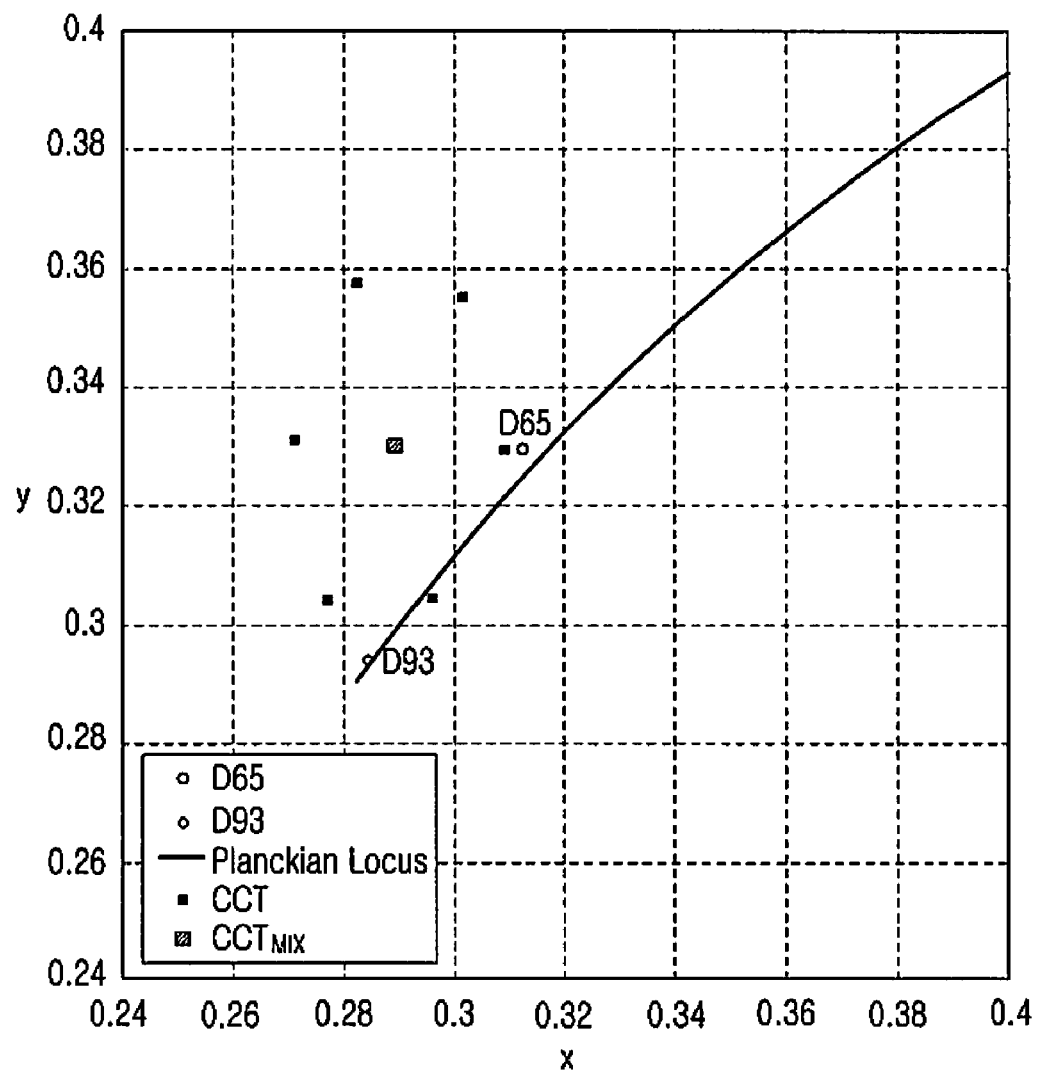
FIG. 2 is a graph illustrating a distribution of color temperatures caused by a coupling error or a loss generated during the installation of primary color light sources, lenses, and beam splitters in a projector.
Figure 3:
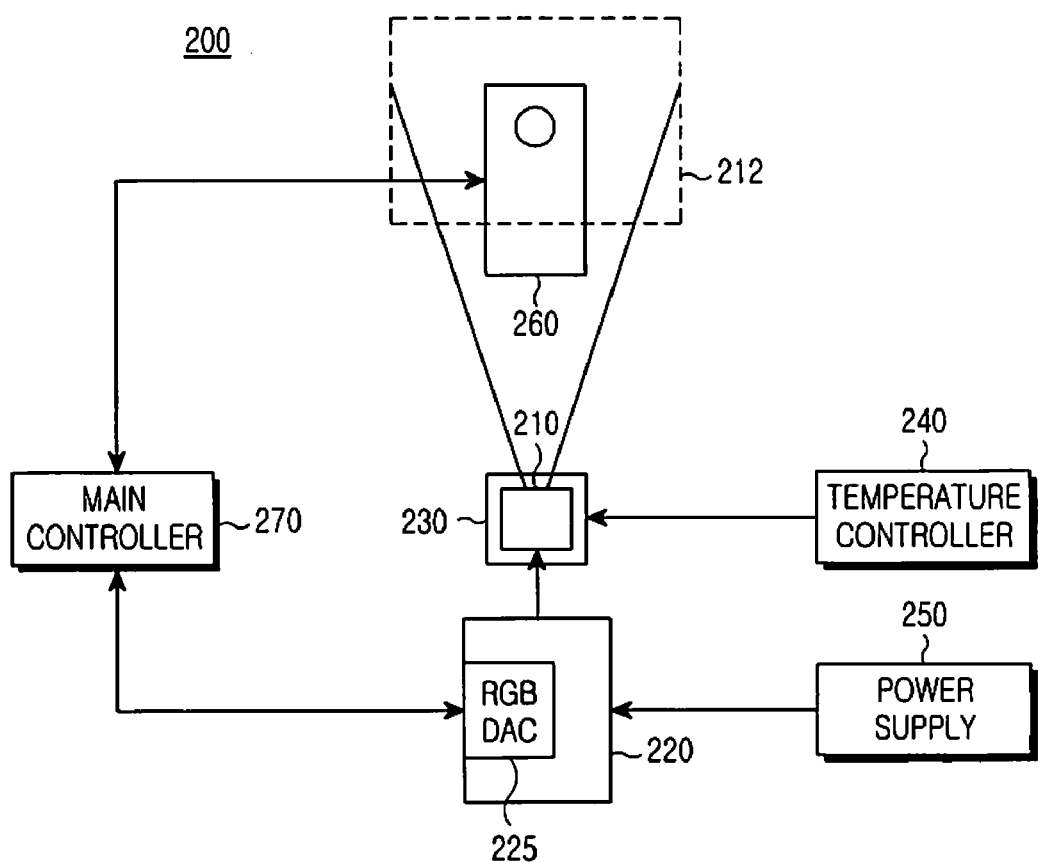
FIG. 3 is a schematic view of an apparatus for calibrating a color temperature of a projector according to an embodiment of the present invention.

FIG. 3 is a schematic view of a color temperature calibrating apparatus according to an embodiment of the present invention.

Referring to FIG. 3, a color temperature calibrating apparatus 200 includes a projector driver 220, a temperature control stage 230, a temperature controller 240, a power supply 250, a colorimeter 260, and a main controller 270. Additionally, a projector 210 is mounted on top of the temperature control stage 230, and the temperature control stage 230 calibrates or constantly maintains the temperature of the projector 210 according to an input temperature control signal. The temperature controller 240 generates a temperature control signal according to a temperature set by the user and outputs the temperature control signal to the temperature control stage 230.

Although the color temperature calibrating apparatus illustrated in FIG. 3 includes the separate temperature controller 240, the function of the temperature controller 240 may be performed by the main controller 270.

The projector driver 220 receives primary color signals, i.e., RGB signals, from the main controller 270, receives power from the power supply 250, and supplies input currents for primary color light sources corresponding to the RGB signals to the projector 210. The primary color signals are digital signals for input current values of the primary color light sources, and the projector driver 220 includes an RGB Digital/Analog Converter (RGB DAC) for converting the digital primary color signals to analog primary color signals.

The projector 210 includes primary color light sources, i.e., RGB light sources, and creates RGB lights by inputting the currents supplied from the projector driver 220 to the RGB light sources. Further, the projector 210 creates and outputs light of a desired color by mixing the RGB lights.

Although the projector driver 220 is provided separately from the projector 210 in FIG. 3, it may be embedded in the projector 210.

The colorimeter 260 detects light introduced from the projector 210, and determines the color coordinate values and brightness value of the light. The colorimeter 260 is located within a region to which the light output from the projector 210 is projected. The colorimeter 260 outputs the measured values to the main controller 270.

The main controller 270 receives, from the user, target color coordinate values and a target brightness value for a reference color light, e.g., white light, obtained by mixing RGB colors, measures the color coordinate values and brightness values for the RGB lights, calculates the target brightness values for the RGB lights using the target values and the measured values, and controls the output of the RGB light sources such that the RGB lights output from the projector 210 have the measured target brightness values, respectively. The main controller 270 may be a general-purpose computer, and the user inputs the target values though a keyboard, a mouse, or the like of the computer.

A color temperature calibrating algorithm according to an embodiment of the present invention will be mathematically described below.

Referring to Equation (2) below, the tristimulus values for the mixed light are obtained by adding the stimulus values for the primary color lights.

$$X_R + X_G + X_B = X_m$$

$$Y_R + Y_G + Y_B = Y_m$$

$$Z_R + Z_G + Z_B = Z_m \quad (2)$$

$x_m$, $y_m$, and $z_m$ correspond to the color values for the mixed light, and $Y_m$ corresponds to the brightness value for the mixed light. As expressed in Equation (3) below, the stimulus values $X_m$ and $Z_m$ are expressed by the functions of $Y_m$, $x_m$, $y_m$, and $z_m$.

$$X_m = \frac{Y_m}{y_m} x_m \quad (3)$$

$$Z_m = \frac{Y_m}{y_m} z_m$$

As expressed in Equations (4) and (5) below, brightness values $Y_i$ for RGB lights can be calculated from color values $x_i$, $y_i$, and $z_i$ for RGB lights, color values $x_m$, $y_m$, and $z_m$ for a mixed light, and a brightness value $Y_m$ for the mixed light. Here, i represents either R, G, or B.

$$\begin{bmatrix} \frac{x_R}{y_R} & \frac{x_G}{y_G} & \frac{x_B}{y_B} \\ 1 & 1 & 1 \\ \frac{z_R}{y_R} & \frac{z_G}{y_G} & \frac{z_B}{y_B} \end{bmatrix} \cdot \begin{bmatrix} Y_R \\ Y_G \\ Y_B \end{bmatrix} = Y_m \begin{bmatrix} \frac{x_m}{y_m} \\ 1 \\ \frac{z_m}{y_m} \end{bmatrix} \quad (4)$$

$$\begin{bmatrix} Y_R \\ Y_G \\ Y_B \end{bmatrix} = \begin{bmatrix} \frac{x_R}{y_R} & \frac{x_G}{y_G} & \frac{x_B}{y_B} \\ 1 & 1 & 1 \\ \frac{z_R}{y_R} & \frac{z_G}{y_G} & \frac{z_B}{y_B} \end{bmatrix}^{-1} \cdot Y_m \begin{bmatrix} \frac{x_m}{y_m} \\ 1 \\ \frac{z_m}{y_m} \end{bmatrix} \quad (5)$$

Figure 4:
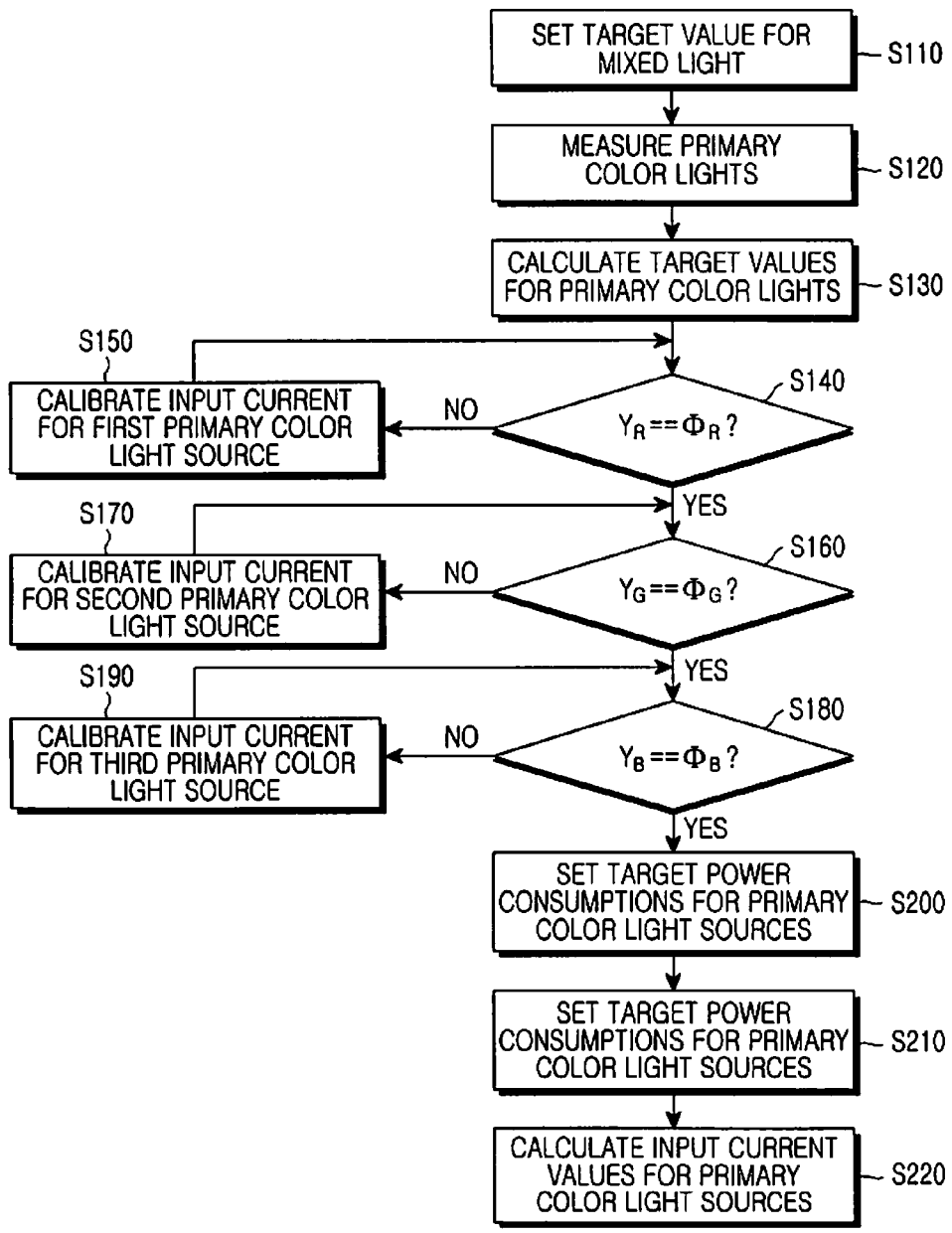
FIG. 4 is a flowchart of a method for calibrating a color temperature of a projector according to an embodiment of the present invention.

FIG. 4 is a flowchart illustrating a method for calibrating a color temperature of a projector according to an embodiment of the present invention.

Referring to FIG. 4, the method includes setting target values for a mixed light in step S110, measuring primary color lights in step S120, calculating target values for the primary color lights in step S130, comparing brightness values for the first primary color light in step S140, calibrating the input current for the first primary color light source in step S150, comparing brightness values for the second primary color light in step S160, calibrating the input current for the second primary color light source in step S170, comparing brightness values for the third primary color light in step S180, calibrating the input current for the third primary color light source in step S190, setting target power consumptions for the primary color light sources in step S200, measuring the power consumptions for the primary color light sources in step S210, and calculating the input current values for the primary color light sources in step S220.

More specifically, in step S110, a target color coordinate $(x_m, y_m)$ or $(CCT_m, \Delta uv_m)$ and a target brightness value $Y_m$ for a white light are input by the user. $\Delta uv_m$ represents the distance between a target correlated color temperature $CCT_m$ and the Planckian locus in the CIE 1931 color space.

In step S120, color coordinate values and brightness values for a red light, a green light, and a blue light are measured, respectively. According to input current values $DAC_{RO}$, $DAC_{GO}$, and $DAC_{BO}$ for a red light source, a green light source, and a blue light source that are set to default values, the main controller 270 sequentially outputs primary color signals representing the default current values to the projector driver 220. The projector driver 220 supplies input currents for the primary color light sources to the projector 210 in correspondence to the primary color signals. The projector 210 sequentially creates and outputs RGB lights by inputting currents provided from the projector driver 220 to the RGB light sources. That is, the projector 210 sequentially drives (or, sequentially turns on or off) the RGB light sources. The calorimeter 260 respectively detects the red light, the green light, and the blue light sequentially introduced from the projector 210 to measure the color coordinate values $(x_i, y_i)$ and the brightness value $\Phi_{io}$. The calorimeter 260 outputs the measured values to the main controller 270.

In step S130, target brightness values $Y_i$ for the RGB lights are calculated. For example, the main controller 270 calculates the target brightness values $Y_i$ by applying the target values $x_m$, $y_m$, and $Y_m$ input by the user and the measured values input from the colorimeter 260 to the above Equation (5).

In step S140, the calculated target brightness value $Y_R$ and the measured brightness value $\Phi_R$ are compared with each other. Thereafter, the main controller 270 compares the brightness values for the second primary color light in step S160, if the comparison value, i.e., the difference, is equal to or smaller than an allowable value, or calibrates the input current for the first primary color light source in step S150, if the comparison value is greater than the allowable value.

In accordance with an embodiment of the present invention, the allowable difference value for each primary color light is set to zero. Accordingly, the main controller 270 determines whether the calculated target brightness value $Y_R$ and the measured brightness value $\Phi_R$ are the same.

In step S150, the output of the red light source is calibrated so that the comparison value for the red light satisfies the allowable value. More specifically, the main controller 270 adds a positive or negative current compensation value corresponding to the comparison value to the previous default current value $DAC_{RO}$ to calculate a new input current value $DAC_R$, and outputs a red signal representing the $DAC_R$ to the projector driver 220. The projector 210 inputs a current based on the red signal provided from the projector driver 220 to the red light source to create and output a red light. The calorimeter 260 detects the red light introduced from the projector 210, and measures the brightness value $\Phi_R$ for the red light to output the measured brightness value $\Phi_R$ to the main controller 270.

Although the steps of comparing brightness values for the primary color lights and the steps of calibrating input currents for the primary color lights are repeated until a specific requirement is satisfied in FIG. 4, alternatively, each step may be performed only once and a new input current value may be calculated by adding a preset increment or decrement to the previous current value when calibrating the input currents for the primary color light sources.

In step S160, the calculated target brightness value $Y_G$ and the measured brightness value $\Phi_G$ are compared with each other. Thereafter, the main controller 270 compares the brightness values for the third primary color light in step S180, if the comparison value is equal to or smaller than the allowable value, or calibrates the input current for the second primary color light source in step S170, if the comparison value is greater than the allowable value. As indicated above, because the allowable difference is set to zero herein, the main controller 270 determines whether the calculated target brightness value $Y_G$ and the measured brightness value $\Phi_G$ are the same.

In step S170, the output of the green light source is calibrated so that the comparison value for the green light satisfies the allowable value. More specifically, the main controller 270 adds a positive or negative current compensation value corresponding to the comparison value to the previous default current value $DAC_{GO}$ to calculate a new input current value $DAC_G$, and outputs a green signal representing the $DAC_G$ to the projector driver 220. The projector 210 inputs a current based on the green signal provided from the projector driver 220 to the green light source to create and output a green light. The colorimeter 260 detects the green light introduced from the projector 210, and measures the brightness value $\Phi_G$ for the green light to output the measured brightness value $\Phi_G$ to the main controller 270.

In step S180, the calculated target brightness value $Y_B$ and the measured brightness value $\Phi_B$ are compared with each other. After the comparison step, the main controller 270 sets target power consumptions for the primary color light sources in step S200, if the comparison value is equal to or smaller than an allowable value, or calibrates the input current for the third primary color light source in step S190, if the comparison value is greater than the allowable value. As indicated above, because the allowable difference is set to zero herein, the main controller 270 determines whether the calculated target brightness value $Y_B$ and the measured brightness value $\Phi_B$ are the same.

In step S190, the output of the blue light source is calibrated such that the comparison value for the blue light satisfies the allowable value. More specifically, the main controller 270 adds a positive or negative current compensation value corresponding to the comparison value to the previous default current value $DAC_{BO}$ to calculate a new input current value $DAC_B$, and outputs a blue signal representing the $DAC_B$ to the projector driver 220. The projector 210 inputs a current based on the blue signal provided from the projector driver 220 to the blue light source to create and output a blue light. The colorimeter 260 detects the blue light introduced from the projector 210, and measures the brightness value $\Phi_B$ for the blue light to output the measured brightness value $\Phi_B$ to the main controller 270.

Alternatively from the method illustrated in FIG. 4, comparing the brightness values for a blue light may be replaced by the step of comparing the CCT values (or the brightness values) for a white light by adjusting the blue signal representing the $DAC_B$. That is, the final step of comparing the blue brightness values substantially corresponds to the step of comparing the target correlated color temperature $CCT_m$ and a measured CCT value for a white light.

Additionally, the specific sequence of comparing brightness values for the primary color lights and calibrating input currents for the primary color light sources may be performed in a different order than specifically illustrated in FIG. 4.

After the color temperature of the white light is calibrated to a desired value through steps S110-S180, the total power consumption of the RGB light sources for the white light may be limited to a predetermined value. This limitation is realized by calibrating the outputs of the primary color light sources based on the ratio of the target power consumptions to the measured power consumptions.

In setting target power consumptions for the primary color light sources in step S200, the main controller 270 receives target power consumption values of RGB light sources for the white light from the user. The target power consumption value $W_0$ is expressed as shown in Equation (6) below.

$$W_0 = \Sigma V_{i0} \cdot I_{i0} \cdot D_i \qquad (6)$$

In Equation (6), $V_{i0} \cdot I_{i0}$ represents a target input power value, i.e., values obtained by multiplying voltage by current, provided to corresponding primary color light sources and $D_i$ represents duty rates for corresponding primary light sources. A duty rate for a primary color light source represents the time rate for driving the primary color light source for one cycle. That is, the primary color light source is turned on and off according to the duty rate.

In step S210, the total power consumption value $W_m$ of the RGB light sources for the creation of a white light is measured. The projector driver 220 outputs the measured total power consumption value $W_m$ to the main controller 270.

The total power consumption value $W_m$ is obtained by adding the power consumption difference $\Delta W$ to the target power consumption value $W_0$ and is expressed as shown in Equation (7) below.

$$W_m = W_0 + \Delta W = \Sigma V_i \cdot I(DAC_i) \cdot D_i \qquad (7)$$

In Equation (7), $V_i \cdot I(DAC_i)$ is the value obtained by measuring the power input to a corresponding primary color light source to create a white light for one cycle.

In step S220, the main controller 270 calculates current values input to the RGB light sources. Current values I (DAC'$_i$) that are calibrated to be input to the RGB light sources to create a white light are calculated by Equation (8) below.

$$I(DAC'_i) = \frac{W_0}{(W_0 + \Delta W)} \cdot I(DAC_i) \qquad (8)$$

Thereafter, the main controller 270 outputs the RGB signals representing the calibrated current values I (DAC'$_i$) to the projector driver 220, restricting the total power consumption of the RGB light sources for the white light to the target power consumption value $W_0$.

In a method for calibrating the color temperature of a projector according to an embodiment of the present invention, the brightness values for the primary color lights are calibrated based on target values for a mixed light set by the user and measured values for the primary color lights, thereby easily and automatically calibrating the color temperature of the projector.

According to the method, the color temperature of the projector can be calibrated by −100 to 100 K with respect to a target color temperature.

Further, because the brightness values of the primary color lights can be calibrated by calibrating input currents for the primary color light sources and the total power consumption for the primary color light sources can be easily restricted by reducing the input current by a predetermined ratio, overheating of the projector can be prevented.

Additionally, it should be apparent that the method for calibrating the color temperature of a projector according to the present invention can be realized in a form of hardware, software, or a combination of thereof. For example, the program may be stored in a volatile or nonvolatile recording medium that can be read by a machine such as a computer. The recording medium may include storage such as ROM, memory such as RAM and the like, a memory chip, an integrated circuit, and the like, and an optical or magnetic recording medium such as a CD, a DVD, a magnetic disk, a magnetic tape, and the like. That is, the method for calibrating the color temperature of a projector may be realized in the form of a program including codes. Moreover, such a program may be electrically transmitted through an arbitrary medium such as wired or wireless communication signals and includes its equivalents.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for calibrating a color temperature of a projector for creating a mixed light of a desired color by mixing colors of primary lights, the method comprising:
   setting target values for the mixed light;
   measuring color coordinate values for each of the primary lights by sequentially outputting the primary lights and sequentially detecting the primary lights;
   calculating target brightness values for each of the primary lights using the target values and the measured color coordinate values; and
   calibrating an output of the primary lights output from the projector based on the calculated target brightness values.

2. The method of claim 1, wherein setting the target values comprises:
   inputting, by a user, target color coordinate values and target brightness value for the mixed light.

3. The method of claim 1, wherein the primary lights include a red light, a green light, and a blue light.

4. The method of claim 1, wherein calibrating the output of the primary lights comprises:
   comparing measured brightness values for the primary colors with the target brightness value for the primary colors; and
   calibrating the output of the primary lights such that the comparison values do not exceed a predetermined allowable value.

5. The method according to claim 4, wherein calibrating the output of the primary lights comprises calibrating input currents for light sources that output the primary lights.

6. The method according to claim 1, further comprising:
   setting the target power consumption value for each of a plurality of primary color light sources;
   measuring the power consumption value for each of the plurality of the primary color light sources; and
   calibrating the output of the primary color light sources based on a ratio of the target power consumption value to the measured power consumption value.

7. The method according to claim 1, wherein calibrating the output of the primary color lights comprises:
   comparing a brightness value measured for one of the primary color lights with a corresponding target brightness value;
   comparing a brightness value measured for the mixed light with a corresponding target brightness value; and
   calibrating the output of the primary color lights such that comparison values do not exceed a predetermined allowable value.

8. The method according to claim 1, wherein calibrating the output of the primary color lights comprises:
   comparing brightness values measured for red and green lights with corresponding target brightness values;
   calibrating the output of the red and green lights such that comparison values for the red and green lights do not exceed a predetermined allowable value.
   comparing a correlated color temperature measured for a white light with a corresponding target correlated color temperature; and
   calibrating the output of a blue light such that a comparison value for the white light does not exceed the predetermined allowable value.

9. An apparatus for calibrating a color temperature of a projector for creating a mixed light of a desired color by mixing colors of primary lights of primary color light sources, the apparatus comprising:
   a colorimeter for measuring color coordinate values for each of the primary lights by sequentially outputting the primary lights and sequentially detecting the primary lights;
   a main controller for receiving target values for the mixed light, calculating target brightness values for each of the primary lights using the target values and the measured color coordinate values, and calibrating an output of the primary lights output from the projector based on the calculated target brightness values.

10. The apparatus of claim 9, wherein the primary lights comprise:
   a red light;
   a green light; and
   a blue light.

* * * * *